US012538288B2

(12) United States Patent
Zhang et al.

(10) Patent No.: US 12,538,288 B2
(45) Date of Patent: Jan. 27, 2026

(54) TECHNIQUES FOR IDENTIFYING FALSELY TRIGGERED SEMI-PERSISTENT SCHEDULING GRANT IN FREQUENCY DIVISION DUPLEXING TRAFFIC ASSOCIATED WITH TRANSMISSION TIME INTERVAL BUNDLING

(71) Applicant: QUALCOMM Incorporated, San Diego, CA (US)

(72) Inventors: Nan Zhang, San Diego, CA (US); Ahmed Omar Desouky Ali, Santa Clara, CA (US); Sumanth Kumar Kota, Hyderabad (IN); Neha Jothi, Spring Valley, CA (US); Zhibin Dang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 18/041,952

(22) PCT Filed: Sep. 21, 2021

(86) PCT No.: PCT/US2021/071524
§ 371 (c)(1),
(2) Date: Feb. 16, 2023

(87) PCT Pub. No.: WO2022/087554
PCT Pub. Date: Apr. 28, 2022

(65) Prior Publication Data
US 2023/0328709 A1  Oct. 12, 2023

(30) Foreign Application Priority Data
Oct. 19, 2020 (IN) .............................. 202041045432

(51) Int. Cl.
*H04W 72/11* (2023.01)
*H04W 72/0446* (2023.01)

(52) U.S. Cl.
CPC ........ *H04W 72/11* (2023.01); *H04W 72/0446* (2013.01)

(58) Field of Classification Search
CPC . H04W 72/21; H04W 72/23; H04W 72/1268; H04W 72/11; H04W 72/0446
See application file for complete search history.

(56) References Cited

U.S. PATENT DOCUMENTS 10,306,606 B2    5/2019  Damnjanovic et al.
11,483,810 B2 *  10/2022 Zhang ................ H04W 74/006
(Continued)

FOREIGN PATENT DOCUMENTS

CN    101677282 A    3/2010
CN    102573096 A    7/2012
(Continued)

OTHER PUBLICATIONS

Asustek: "Clarification on UE Behaviour at TTI Bundling Configuration", 3GPP TSG-RAN WG2 #64, 3GPP Draft Disc For R2-086144 Clarification on UE Behaviour at TTI Bundling Configuration, 3rd Generation Partnership Project, Mobile Competence Centre, 650, Route Des Lucioles, F-06921 Sophia-Antipolis Cedex, France, No. Prague, Czech Republic, Nov. 4, 2008, Nov. 4, 2008, pp. 1-3, XP050321054, [retrieved on Nov. 4, 2008] figures 1, 2 sections: 2.1, 2.2, p. 1-p. 2.

(Continued)

Primary Examiner — Raj Jain
(74) Attorney, Agent, or Firm — Harrity & Harrity, LLP

(57) ABSTRACT

Various aspects of the present disclosure generally relate to wireless communication. In some aspects, a user equipment (UE) may receive first configuration information indicating (Continued)

a transmission time interval (TTI) bundling resource. The UE may receive second configuration information indicating semi-persistent scheduling (SPS) resources. The UE may detect, during a communication session, an SPS trigger for using the SPS resources in a subframe that is misaligned with a periodicity associated with the TTI bundling resource. The UE may determine whether the SPS trigger is valid based at least in part on a number of TTI bundling grants subsequent to the detection of the SPS trigger that are misaligned with the subframe associated with the SPS trigger. Numerous other aspects are provided.

26 Claims, 8 Drawing Sheets

(56) References Cited

U.S. PATENT DOCUMENTS

| | | | |
|---|---|---|---|
| 2015/0098341 | A1 | 4/2015 | Ramkumar et al. |
| 2015/0098371 | A1 | 4/2015 | Vajapeyam et al. |
| 2018/0176937 | A1* | 6/2018 | Chen ............... H04W 72/21 |
| 2019/0141729 | A1 | 5/2019 | Hosseini et al. |
| 2020/0275431 | A1* | 8/2020 | Bae ............... H04W 72/04 |
| 2023/0328709 | A1* | 10/2023 | Zhang ............... H04L 5/0053 370/329 |
| 2024/0276596 | A1* | 8/2024 | Zhang ............... H04W 76/19 |

FOREIGN PATENT DOCUMENTS

| | | |
|---|---|---|
| TW | 201414256 A | 4/2014 |
| WO | 2017200879 A1 | 11/2017 |
| WO | 2018210493 A1 | 11/2018 |

OTHER PUBLICATIONS

International Search Report and Written Opinion—PCT/US2021/071524—ISA/EPO—Jan. 5, 2022.
Ericsson: "Draft CR for SPS Operation with Short TTI", 3GPP TSG-RAN2 Meeting #98, R2-1705830, Hangzhou, China, May 15, 2017-May 19, 2017, May 12, 2017, 8 pages.
Huawei., et al., "Modelling of Grant Free and SPS", 3GPP TSG-RAN AdHoc, R2-1707247, Qingdao, China, Jun. 27, 2017-Jun. 29, 2017, Jun. 17, 2017, 7 pages.
Intel Corporation: "SPS and TTI Bundling Support in Dual Connectivity", 3GPP TSG RAN WG2 Meeting #85bis, R2-141207, Valencia, Spain, Mar. 31, 2014-Apr. 4, 2014, Mar. 22, 2014, pp. 1-3.

* cited by examiner

TECHNIQUES FOR IDENTIFYING FALSELY TRIGGERED SEMI-PERSISTENT SCHEDULING GRANT IN FREQUENCY DIVISION DUPLEXING TRAFFIC ASSOCIATED WITH TRANSMISSION TIME INTERVAL BUNDLING

CROSS-REFERENCE TO RELATED APPLICATION

This application is a 371 national stage of PCT Application No. PCT/US2021/071524 filed on Sep. 21, 2021, entitled "TECHNIQUES FOR IDENTIFYING FALSELY TRIGGERED SEMI-PERSISTENT SCHEDULING GRANT IN FREQUENCY DIVISION DUPLEXING TRAFFIC ASSOCIATED WITH TRANSMISSION TIME INTERVAL BUNDLING," which claims priority to Indian Patent Application number 202041045432, filed on Oct. 19, 2020, entitled "TECHNIQUES FOR IDENTIFYING FALSELY TRIGGERED SEMI-PERSISTENT SCHEDULING GRANT IN FREQUENCY DIVISION DUPLEXING TRAFFIC ASSOCIATED WITH TRANSMISSION TIME INTERVAL BUNDLING." The disclosure of the prior applications are considered part of and are hereby expressly incorporated by reference in this patent application.

FIELD OF THE DISCLOSURE

Aspects of the present disclosure generally relate to wireless communication and to techniques and apparatuses for identifying a falsely triggered semi-persistent scheduling (SPS) grant in frequency division duplexing (FDD) traffic associated with transmission time interval (TTI) bundling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving first configuration information indicating a transmission time interval (TTI) bundling resource; receiving second configuration information indicating semi-persistent scheduling (SPS) resources; detecting, during a communication session, an SPS trigger for using the SPS resources in a subframe, wherein the subframe is misaligned with a periodicity associated with the TTI bundling resource; and determining whether the SPS trigger is valid based at least in part on a number of TTI bundling grants subsequent to the detection of the SPS trigger that are misaligned with the subframe associated with the SPS trigger.

In some aspects, determining whether the SPS trigger is valid includes: determining that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In some aspects, the method includes reverting to a transmission schedule that is based at least in part on a grant time associated with a most recent TTI bundling grant prior to the SPS trigger based at least in part on the determination that the SPS trigger is invalid.

In some aspects, determining whether the SPS trigger is valid includes: determining that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In some aspects, the method includes maintaining a transmission schedule that is based at least in part on the subframe associated with the SPS trigger based at least in part on the determination that the SPS trigger is valid.

In some aspects, each of the TTI bundling grants is addressed to a cell radio network temporary identity (C-RNTI) assigned to the UE for TTI bundling.

In some aspects, the SPS trigger is detected based at least in part on an erroneous downlink control channel decoding result.

In some aspects, the SPS trigger is detected based at least in part on a downlink control channel message, received from a base station, erroneously triggering use of the SPS resources in the subframe that is misaligned with the periodicity associated with the TTI bundling resource.

In some aspects, the periodicity associated with the TTI bundling is based at least in part on a TTI bundle size.

In some aspects, the TTI bundle size is four.

In some aspects, the communication session includes traffic associated with a Voice over Long Term Evolution (VoLTE) call.

In some aspects, a UE for wireless communication includes a memory; and one or more processors, coupled to the memory, configured to: receive first configuration information indicating a TTI bundling resource; receive second configuration information indicating SPS resources; detect, during a communication session, an SPS trigger for using the SPS resources in a subframe, wherein the subframe is misaligned with a periodicity associated with the TTI bundling resource; and determine whether the SPS trigger is valid based at least in part on a number of TTI bundling grants subsequent to the detection of the SPS trigger that are misaligned with the subframe associated with the SPS trigger.

In some aspects, the one or more processors, to determine whether the SPS trigger is valid, are configured to: determine that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In some aspects, the one or more processors are further configured to: revert to a transmission schedule that is based at least in part on a grant time associated with a most recent TTI bundling grant prior to the SPS trigger based at least in part on the determination that the SPS trigger is invalid.

In some aspects, the one or more processors, to determine whether the SPS trigger is valid, are configured to: determine that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In some aspects, the one or more processors are further configured to: maintain a transmission schedule that is based at least in part on the subframe associated with the SPS trigger based at least in part on the determination that the SPS trigger is valid.

In some aspects, each of the TTI bundling grants is addressed to a C-RNTI assigned to the UE for TTI bundling.

In some aspects, the SPS trigger is detected based at least in part on an erroneous downlink control channel decoding result.

In some aspects, the SPS trigger is detected based at least in part on a downlink control channel message, received from a base station, erroneously triggering use of the SPS resources in the subframe that is misaligned with the periodicity associated with the TTI bundling resource.

In some aspects, the periodicity associated with the TTI bundling is based at least in part on a TTI bundle size.

In some aspects, the TTI bundle size is four.

In some aspects, the communication session includes traffic associated with a VoLTE call.

In some aspects, a non-transitory computer-readable medium storing a set of instructions for wireless communication includes one or more instructions that, when executed by one or more processors of a UE, cause the UE to: receive first configuration information indicating a TTI bundling resource; receive second configuration information indicating SPS resources; detect, during a communication session, an SPS trigger for using the SPS resources in a subframe, wherein the subframe is misaligned with a periodicity associated with the TTI bundling resource; and determine whether the SPS trigger is valid based at least in part on a number of TTI bundling grants subsequent to the detection of the SPS trigger that are misaligned with the subframe associated with the SPS trigger.

In some aspects, the one or more instructions, that cause the UE to determine whether the SPS trigger is valid, cause the UE to: determine that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In some aspects, the one or more instructions further cause the UE to: revert to a transmission schedule that is based at least in part on a grant time associated with a most recent TTI bundling grant prior to the SPS trigger based at least in part on the determination that the SPS trigger is invalid.

In some aspects, the one or more instructions, that cause the UE to determine whether the SPS trigger is valid, cause the UE to: determine that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In some aspects, the one or more instructions further cause the UE to: maintain a transmission schedule that is based at least in part on the subframe associated with the SPS trigger based at least in part on the determination that the SPS trigger is valid.

In some aspects, each of the TTI bundling grants is addressed to a C-RNTI assigned to the UE for TTI bundling.

In some aspects, the SPS trigger is detected based at least in part on an erroneous downlink control channel decoding result.

In some aspects, the SPS trigger is detected based at least in part on a downlink control channel message, received from a base station, erroneously triggering use of the SPS resources in the subframe that is misaligned with the periodicity associated with the TTI bundling resource.

In some aspects, the periodicity associated with the TTI bundling is based at least in part on a TTI bundle size.

In some aspects, the TTI bundle size is four.

In some aspects, the communication session includes traffic associated with a VoLTE call.

In some aspects, an apparatus for wireless communication includes means for receiving first configuration information indicating a TTI bundling resource; means for receiving second configuration information indicating SPS resources; means for detecting, during a communication session, an SPS trigger for using the SPS resources in a subframe, wherein the subframe is misaligned with a periodicity associated with the TTI bundling resource; and means for determining whether the SPS trigger is valid based at least in part on a number of TTI bundling grants subsequent to the detection of the SPS trigger that are misaligned with the subframe associated with the SPS trigger.

In some aspects, the means for determining whether the SPS trigger is valid includes: means for determining that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In some aspects, the apparatus includes means for reverting to a transmission schedule that is based at least in part on a grant time associated with a most recent TTI bundling grant prior to the SPS trigger based at least in part on the determination that the SPS trigger is invalid.

In some aspects, the means for determining whether the SPS trigger is valid includes: means for determining that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In some aspects, the apparatus includes means for maintaining a transmission schedule that is based at least in part on the subframe associated with the SPS trigger based at least in part on the determination that the SPS trigger is valid.

In some aspects, each of the TTI bundling grants is addressed to a C-RNTI assigned to the apparatus for TTI bundling.

In some aspects, the SPS trigger is detected based at least in part on an erroneous downlink control channel decoding result.

In some aspects, the SPS trigger is detected based at least in part on a downlink control channel message, received from a base station, erroneously triggering use of the SPS resources in the subframe that is misaligned with the periodicity associated with the TTI bundling resource.

In some aspects, the periodicity associated with the TTI bundling is based at least in part on a TTI bundle size.

In some aspects, the TTI bundle size is four.

In some aspects, the communication session includes traffic associated with a VoLTE call.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
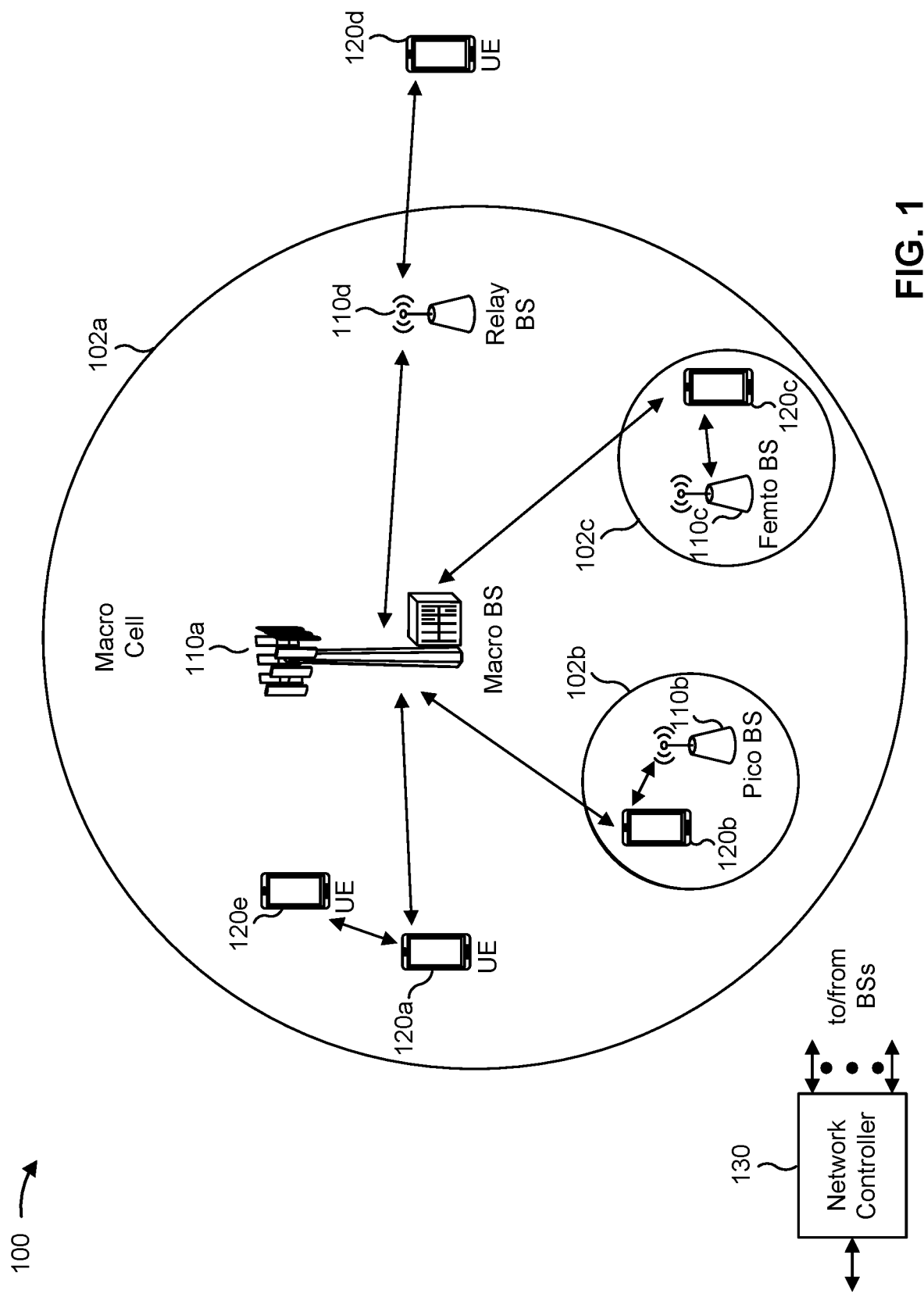
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
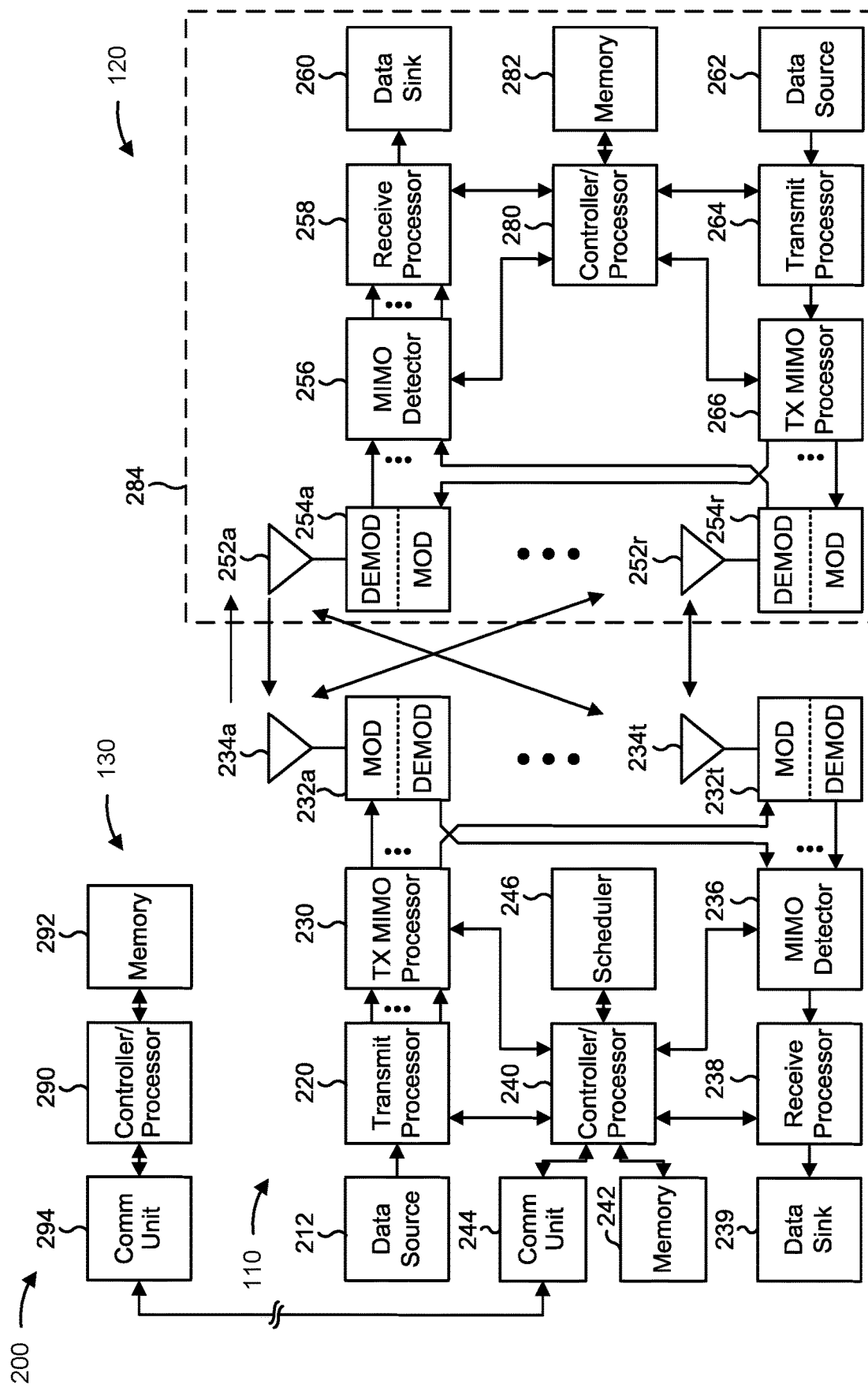
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with identifying a falsely triggered semi-persistent scheduling (SPS) grant in frequency division duplexing (FDD) traffic associated with transmission time interval (TTI) bundling, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE 120 includes means for receiving first configuration information indicating a TTI bundling resource, means for receiving second configuration information indicating SPS resources, means for detecting, during a communication session, an SPS trigger for using the SPS resources in a subframe that is misaligned with a periodicity associated with the TTI bundling resource, and/or means for determining whether the SPS trigger is valid based at least in part on a number of TTI bundling grants subsequent to the detection of the SPS trigger that are misaligned with the subframe associated with the SPS trigger. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for determining that the SPS grant is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In some aspects, the UE 120 includes means for reverting to a transmission schedule that is based at least in part on a grant time associated with a most recent TTI bundling grant prior to the SPS trigger based at least in part on the determination that the SPS trigger is invalid.

In some aspects, the UE 120 includes means for determining that the SPS grant is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In some aspects, the UE 120 includes means for maintaining a transmission schedule that is based at least in part on the subframe associated with the SPS trigger based at least in part on the determination that the SPS trigger is valid.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
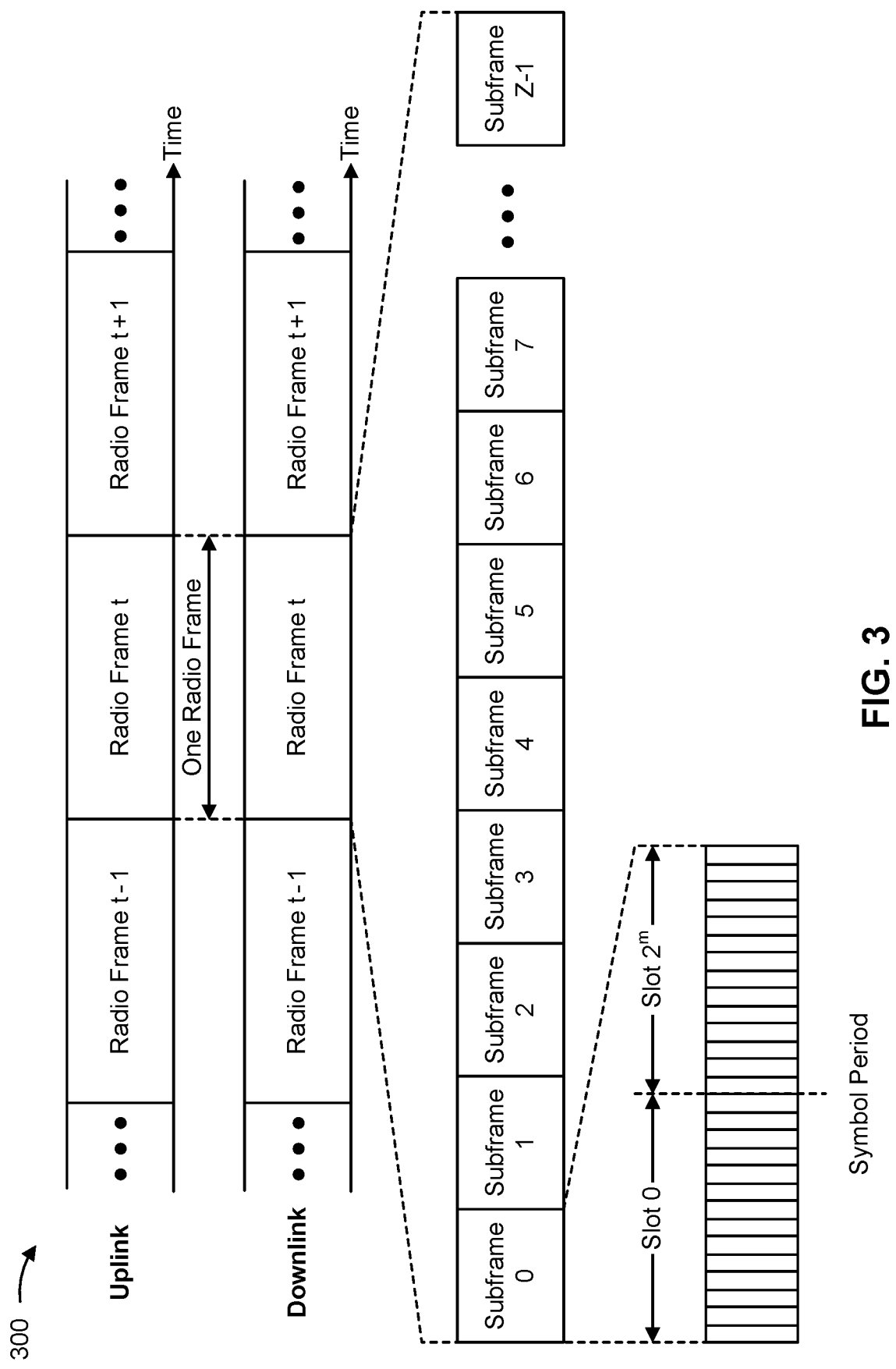
FIG. 3 is a diagram illustrating an example of a frame structure in a wireless network, in accordance with the present disclosure

FIG. 3 is a diagram illustrating an example 300 of a frame structure in a wireless network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
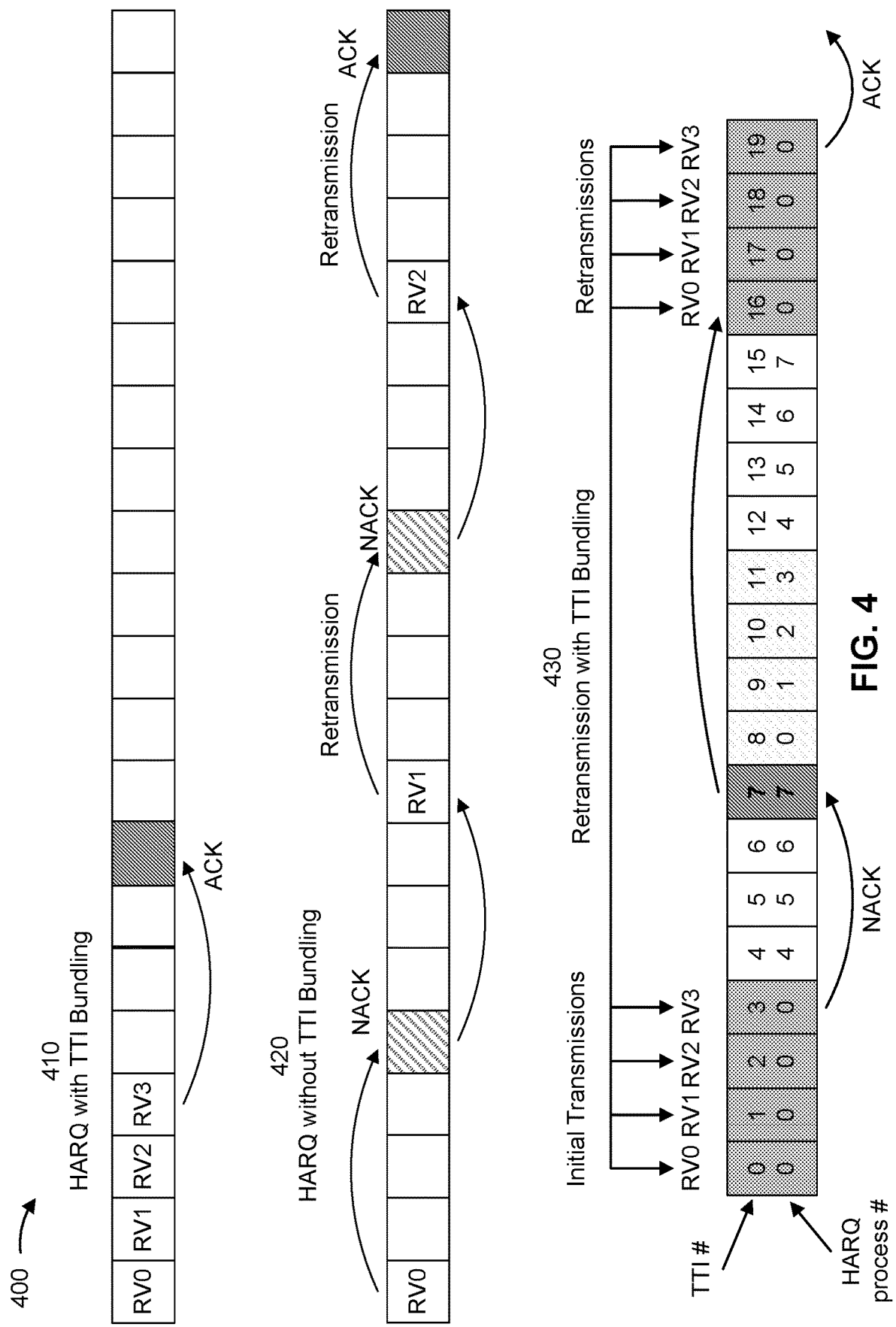
FIG. 4 is a diagram illustrating an example of transmission time interval (TTI) bundling, in accordance with the present disclosure.

FIG. 4 is a diagram illustrating an example 400 of transmission time interval (TTI) bundling, in accordance with the present disclosure. In some aspects, example 400 illustrates TTI bundling with a bundle size of four (4).

As shown in FIG. 4, a UE 120 may transmit uplink data to a base station 110 using TTI bundling. As shown by reference number 410, with TTI bundling, the UE 120 may transmit four hybrid automatic repeat request (HARQ) redundancy versions (RVs) of the uplink data in four corresponding TTIs (e.g., subframes and/or the like) that are consecutive in time. As shown by reference number 420, without TTI bundling, the UE 120 may transmit a first RV, may wait for acknowledgement (ACK) or negative acknowledgement (NACK) (ACK/NACK) feedback, may transmit a second RV if a NACK is received for the first RV, may wait for ACK/NACK feedback for the second RV, and so on until an ACK is received.

Accordingly, TTI bundling may reduce latency, particularly in scenarios where an ACK is unlikely to be received for the initial transmission (e.g., when the UE 120 is experiencing poor channel conditions, has limited transmit power, and/or the like). For example, in example 400 of FIG. 4, an ACK is received in the seventh subframe after transmission of the initial RV (shown as RV0) when TTI bundling is used, but an ACK is not received until the twentieth subframe after transmission of the initial RV when TTI bundling is not used. When channel conditions are very poor, TTI bundling may reduce latency even further. For example, as shown by reference number 430, transmission of all 4 redundancy versions using TTI bundling may still result in a NACK when channel conditions are very poor. However, retransmission of all 4 RVs using TTI bundling may result in an ACK. Without TTI bundling, each individual RV would be separated by (for example) at least 8 subframes, resulting in higher latency.

In some aspects, TTI bundling may be enabled for a UE 120 (e.g., by a base station 110) when the UE 120 is experiencing poor channel conditions, such as when the UE 120 is located near a cell edge and/or when the UE 120 has power limitations that prevent the UE 120 from transmitting the uplink data with a high transmit power. Additionally, or alternatively, a base station 110 may enable TTI bundling for a UE 120 engaged in a high-priority communication session, such as a Voice over Long Term Evolution (VoLTE) call. For example, enabling TTI bundling may increase the likelihood that the base station 110 successfully receives the uplink data when the UE 120 is in limiting conditions and/or engaged in high-priority communication, which may increase reliability, reduce latency, and/or the like.

In general, as shown in FIG. 4, TTI bundling may always use a bundle size of four (4), whereby the UE 120 bundles 4 RVs of uplink data in 4 consecutive TTIs. In other words, when TTI bundling is enabled with a bundle size of 4, the UE 120 transmits the same packet 4 times in 4 consecutive uplink subframes. However, it will be appreciated that other types of TTI bundling may be enabled. For example, enhanced TTI bundling may be enabled to reduce a number of HARQ processes from 4 to three (3), which can reduce a round trip time (e.g., from 16 ms to 12 ms) for uplink voice traffic and/or medium data rate physical uplink shared channel (PUSCH) transmissions using FDD. Additionally, or alternatively, enhanced TTI bundling may support a capability to handle uplink grants that cover more than 3 resource blocks.

Accordingly, because uplink HARQ is synchronous, the UE 120 may generally expect the base station 110 to assign uplink grants with a periodicity that is based on a multiple of 4 subframes when TTI bundling and/or enhanced TTI bundling is enabled with a bundling size of four. For example, if an uplink grant is assigned to bundle uplink transmissions in consecutive subframes starting in subframe zero (0), the UE 120 may expect a next uplink grant to bundle uplink transmissions starting in subframe N, 2N, 3N, and/or the like, where N=4.

As indicated above, FIG. 4 is provided as an example. Other examples may differ from what is described with respect to FIG. 4.

Figure 5:
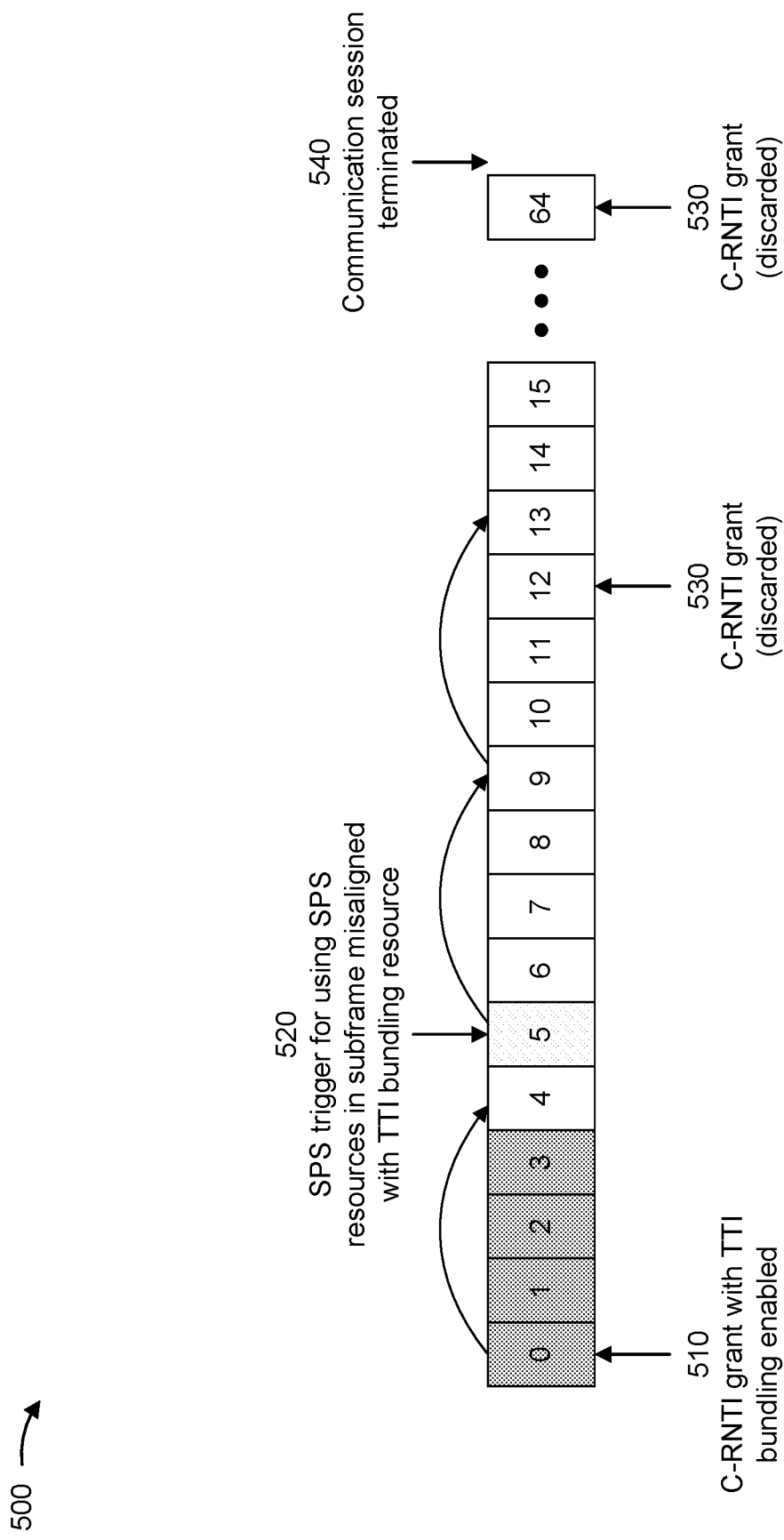
FIG. 5 is a diagram illustrating an example of a falsely triggered semi-persistent scheduling (SPS) grant causing a communication session to terminate, in accordance with the present disclosure.

FIG. 5 is a diagram illustrating an example 500 of a falsely triggered semi-persistent scheduling (SPS) grant causing a communication session to terminate, in accordance with the present disclosure. For example, SPS enables radio resources to be semi-statically configured and allocated to a UE for a longer time period than one subframe, which may avoid the need for specific downlink assignment messages over a physical downlink control channel (PDCCH) for each subframe. To configure SPS, radio resource control (RRC) signaling may indicate an interval at which the radio resources are periodically assigned. PDCCH signaling may indicate specific transmission resource allocations in a time/frequency domain and further indicate one or more transmission attributes (e.g., periodicity, modulation and control scheme (MCS), time offset, transmit power, and/or the like). For uplink SPS, non-adaptive synchronous hybrid automatic repeat request (HARQ) is performed. For example, non-adaptive retransmissions may be performed on a same resource and with a same MCS as was used for a last (e.g., previous) transmission. For downlink SPS, adaptive asynchronous HARQ is performed. For example, adaptive retransmissions may be performed on a resource and, if provided, with the MCS indicated on the PDCCH.

Accordingly, SPS may significantly reduce control channel overhead for applications that require persistent radio resource allocations. For example, in LTE, both the downlink and the uplink are fully scheduled because downlink and uplink traffic channels are dynamically shared channels. As a result, the PDCCH must provide access grant information to indicate which UEs should decode a physical downlink shared channel (PDSCH) in each subframe and which UEs are allowed to transmit on a physical uplink shared channel (PUSCH) in each subframe. Without SPS, every downlink or uplink physical resource block (PRB)

allocation must be granted via an access grant message on the PDCCH, which may suffice for most bursty best effort types of applications that generally have large packet sizes with only a few UEs typically scheduled in each subframe. However, for applications that require persistent allocations of small packets (e.g., VoLTE), the access grant control channel overhead can be greatly reduced with SPS by configuring a semi-persistent PRB allocation that a UE can expect on a downlink or use to transmit on an uplink.

Although SPS can significantly reduce control channel overhead for traffic that requires a persistent radio resource allocation, problems can arise when SPS is enabled together with TTI bundling to improve uplink coverage. For example, in LTE, 1 ms subframes are defined as a TTI, which means that scheduling occurs every 1 ms. Although small TTIs are generally useful to reduce round trip latency, small TTIs introduce challenges for uplink coverage. For example, because a HARQ interlace time is eight (8) ms, the subframe utilization is very low (1/8). In other words, without TTI bundling, a UE does not transmit in 7 out of every 8 subframes (or TTIs). Therefore, UEs in poor coverage areas may transmit more power when TTI bundling or enhanced TTI bundling is enabled, as described in more detail above with reference to FIG. 4.

Accordingly, in some cases, TTI bundling and SPS may be simultaneously enabled to improve coverage, capacity, and/or quality for traffic associated with an FDD configuration, such as VoLTE. However, in some cases, an SPS trigger (or SPS grant) may be erroneously triggered by a network (e.g., due to a misconfiguration) and/or by false PDCCH detection (e.g., where noise on a PDCCH causes a UE to detect the SPS trigger based on an erroneous PDCCH decoding result). In cases where the SPS trigger indicates that SPS resources are to be used in a subframe that is not aligned with TTI bundling grants (e.g., uplink grants included in downlink control information (DCI) addressed to a cell radio network temporary identity (C-RNTI) assigned to the UE for TTI bundling), the UE may shift a scheduling timeline according to the false SPS trigger and discard all subsequent C-RNTI grants, which will eventually result in a communication terminating or otherwise failing.

For example, in FIG. 5, a UE may be associated with an FDD configuration enabling SPS and TTI bundling. As shown by reference number 510, the UE may receive a C-RNTI grant (e.g., a DCI message including an uplink grant addressed to the C-RNTI assigned to the UE), which may alternatively be referred to herein as a TTI bundling grant and/or the like. Because TTI bundling is enabled, the UE transmits the same packet four times in four consecutive uplink subframes. Furthermore, because uplink HARQ is synchronous, the UE may expect a base station to assign subsequent uplink grants with a periodicity that is a multiple of 4 subframes from a grant time associated with a most recent C-RNTI grant. For example, if the most recent C-RNTI grant is associated with a grant time in subframe 0, the UE may expect subsequent uplink grants to be assigned in subframes that are multiples of 4 from subframe 0 (e.g., subframe 4, 8, 12, and/or the like).

In cases where the UE detects an SPS trigger for using SPS resources in a subframe that is misaligned with the TTI bundling periodicity, the UE may shift a scheduling timeline according to the subframe associated with the SPS trigger. For example, as shown by reference number 520, the UE may detect an SPS trigger for using SPS resources in subframe five (5), which is misaligned with the periodicity associated with the TTI bundling resource. Accordingly, as shown, the UE may expect subsequent uplink grants to be assigned to subframes that are a multiple of 4 from the subframe associated with the SPS trigger (e.g., subframe 9, 13, and/or the like). However, when the use of SPS resources is falsely triggered due to a network misconfiguration and/or an erroneous PDCCH decoding result, subsequent C-RNTI grants from the network will follow the original timing (prior to the SPS trigger) and will be misaligned with the subframe associated with the SPS trigger. For example, as shown by reference number 530, the UE may receive one or more C-RNTI grants that are misaligned with respect to the subframe associated with the SPS trigger (e.g., are not multiples of four with respect to the subframe associated with the SPS trigger).

Accordingly, the UE discards the C-RNTI grants that are misaligned with the subframe associated with the SPS trigger, and the UE is able to transmit only SPS PUSCH transmissions. However, most of the SPS PUSCH transmissions will receive a NACK from the network, because the SPS PUSCH transmissions are not correctly aligned with the last valid grant (e.g., the most recent C-RNTI grant prior to the false SPS trigger). Furthermore, although the SPS PUSCH transmissions may occasionally receive an ACK from the network (e.g., where the SPS PUSCH transmissions happen to temporarily align with the subframe associated with the SPS trigger), the relatively few successful uplink transmissions will not suffice to maintain the communication session. As a result, as shown by reference number 540, the communication session will eventually terminate due to the false (e.g., erroneous) SPS trigger that causes all subsequent (valid) C-RNTI grants to be misaligned.

Some aspects described herein relate to techniques and apparatuses for identifying a falsely triggered SPS grant in FDD traffic associated with TTI bundling. For example, because a network is not expected to provide a UE with C-RNTI grants that are misaligned with a periodicity of a TTI bundling resource, discarded C-RNTI grants may be used as a metric to validate or invalidate an SPS trigger for using SPS resources in a subframe that is misaligned with the periodicity of the TTI bundling resource. For example, in cases where the SPS trigger is valid, subsequent C-RNTI grants may generally be aligned with the subframe associated with the SPS trigger. However, in cases where the SPS trigger is invalid, the subsequent C-RNTI grants may be mostly misaligned with the subframe associated with the SPS trigger. Accordingly, when a UE receives an SPS trigger after TTI bundling is enabled, the UE may determine a number of subsequent C-RNTI grants that are discarded due to a misalignment with the subframe associated with the SPS trigger.

The UE may then determine whether the SPS trigger is valid or invalid based on the number of subsequent C-RNTI grants that are discarded. For example, the UE may determine that the SPS trigger is invalid if a proportion of discarded C-RNTI grants, out of a total number of C-RNTI grants, satisfies (e.g., exceeds) a threshold, and may otherwise determine that the SPS trigger is valid if the proportion of discarded C-RNTI grants, out of the total number of C-RNTI grants, fails to satisfy (e.g., is less than or equal to) the threshold. In this way, the UE may detect a false SPS trigger (e.g., a false alarm or false positive caused by a network misconfiguration and/or an erroneous PDCCH decoding result) and revert to a previous transmission schedule to ensure continuity of the communication session.

As indicated above, FIG. 5 is provided as an example. Other examples may differ from what is described with respect to FIG. 5.

Figure 6:
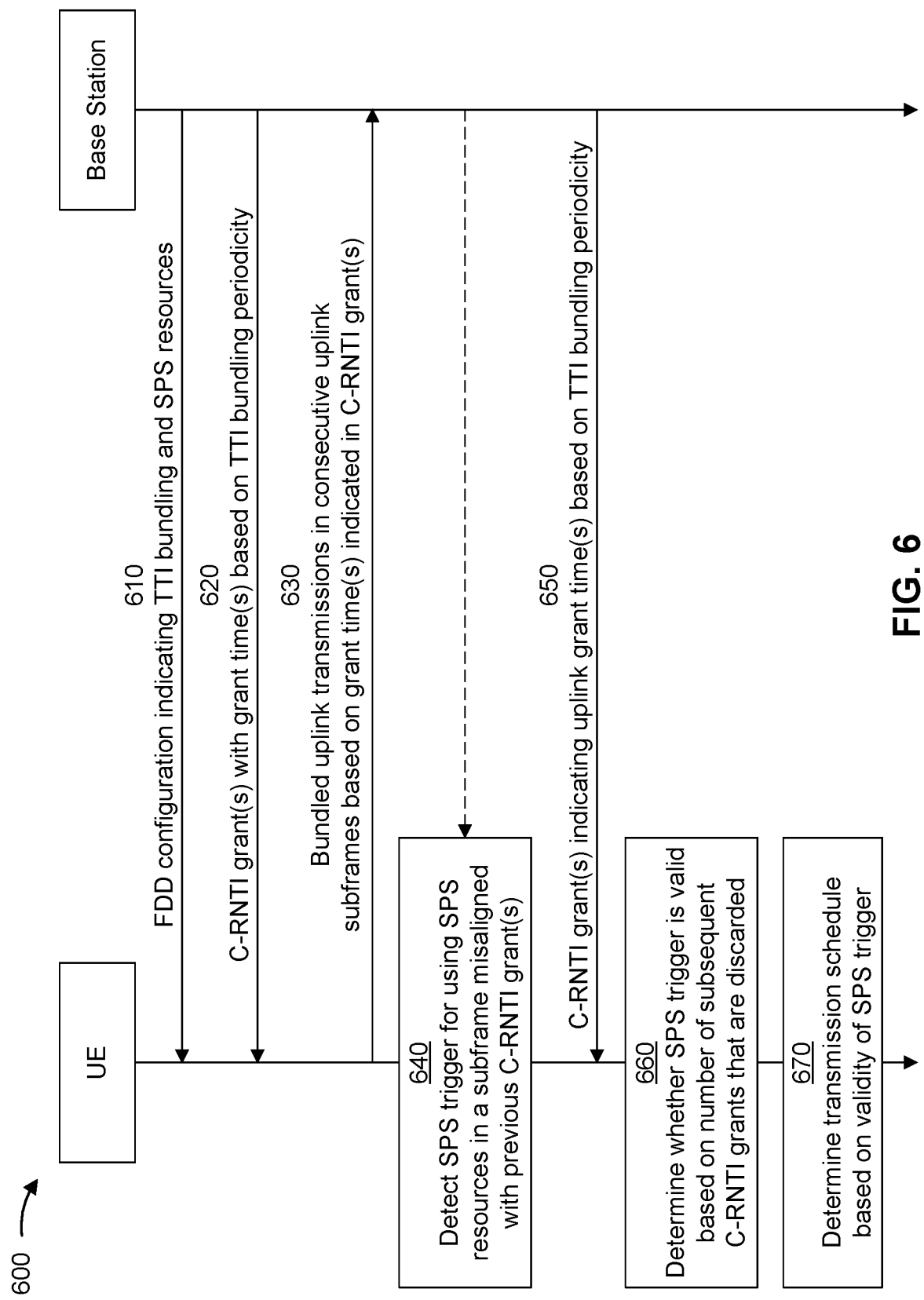
FIG. 6 is a diagram illustrating an example associated with identifying a falsely triggered SPS grant in frequency division duplexing (FDD) traffic associated with TTI bundling, in accordance with the present disclosure.

FIG. 6 is a diagram illustrating an example 600 associated with identifying a falsely triggered SPS grant in FDD traffic associated with TTI bundling, in accordance with the present disclosure. As shown in FIG. 6, example 600 includes a UE (e.g., UE 120) in communication with a base station (e.g., base station 110) in a wireless network (e.g., wireless network 100). In some aspects, the UE and the base station may communicate via a wireless access link, which may include an uplink and a downlink.

As shown in FIG. 6, and by reference number 610, the base station may transmit, and the UE may receive, FDD configuration indicating TTI bundling resources and/or SPS resources. For example, the FDD configuration may include first configuration information indicating the TTI bundling resource and second configuration information indicating the SPS resources. In some aspects, the FDD configuration may be received in one or more RRC messages, one or more DCI messages, and/or the like. In some aspects, the FDD configuration may simultaneously enable TTI bundling and SPS for any suitable FDD traffic or FDD communication session, such as a VoLTE call.

In some aspects, the TTI bundling resource may be associated with a parameter (e.g., TTI_BUNDLE_SIZE) that has a value of four (4) to indicate a TTI bundle size. Accordingly, the first configuration information may generally indicate a periodicity for TTI bundling based on the TTI bundle size, and the first configuration information may further indicate a C-RNTI that is assigned to the UE for TTI bundling. For example, when the UE receives a valid uplink grant (e.g., an uplink grant addressed to the C-RNTI assigned to the UE for TTI bundling, which may be referred to herein as a C-RNTI grant or a TTI bundling grant), the UE may transmit the same packet four times in four consecutive TTIs (e.g., subframes). Alternatively, in some aspects, the TTI bundling resource may be associated with an enhanced TTI bundling configuration, which may reduce the number of HARQ processes from 4 to 3. Furthermore, based on the TTI bundle size of four, the UE may generally expect subsequent C-RNTI grants to be assigned to TTIs with a periodicity that is a multiple of 4 TTIs from a most recent valid C-RNTI grant. In some aspects, the SPS resources indicated in the second configuration information may include a PRB allocation that is assigned to the UE. For example, as described above, RRC signaling may indicate an interval at which radio resources are periodically assigned to the UE, and PDCCH signaling may trigger use of the SPS resources by indicating specific transmission resource allocations in a time/frequency domain.

As further shown in FIG. 6, and by reference number 620, the UE may receive one or more C-RNTI grants that are associated with grant times based on the TTI bundling periodicity. For example, each C-RNTI grant may correspond to an uplink grant included in DCI format 0 to indicate a TTI in which the UE is to perform bundled uplink transmissions. For example, each C-RNTI grant may indicate the TTI according to a system frame number and a subframe number, and the subframe number associated with each TTI may be a multiple of four subframes away from a subframe number associated with a previous TTI. Accordingly, as shown by reference number 630, the UE may perform bundled uplink transmissions in consecutive uplink subframes based on the grant time(s) indicated in the C-RNTI grant(s) addressed to the UE.

As further shown in FIG. 6, and by reference number 640, the UE may detect an SPS trigger scheduling use of the configured SPS resources in an upcoming subframe that is misaligned with the previous C-RNTI grants. For example, given a TTI bundling size of four, the subframe associated with the SPS trigger may be misaligned with the previous C-RNTI grant(s) in cases where the SPS trigger schedules use of the configured SPS resources in subframe 4N+1, 4N+2, or 4N+3 from a last C-RNTI grant associated with TTI bundling. In other words, the subframe associated with the SPS trigger may be misaligned with the previous C-RNTI grant(s) where a difference between the subframe associated with the SPS trigger and the first subframe associated with the previous C-RNTI grant(s) modulo 4 does not equal zero (0).

In some aspects, the SPS trigger may be a valid trigger that the base station transmits to the UE to activate the configured SPS resources. In such cases, the transmission schedule may be shifted based on the subframe associated with the SPS trigger, such that the UE expects subsequent C-RNTI grants to be multiples of four subframes after the subframe associated with the SPS trigger. However, in some cases, the SPS trigger may be erroneously detected by the UE and/or erroneously transmitted by the base station. For example, the UE may detect the SPS trigger based on an erroneous decoding result for a downlink control channel (e.g., a PDCCH), which may occur due to noise on the downlink control channel (e.g., when a sixteen-bit cyclic redundancy check (CRC) is used).

Additionally, or alternatively, in some cases, the base station may erroneously transmit the SPS trigger in a downlink control channel due to a network misconfiguration, a misconfiguration of the base station, and/or anomalous behavior, among other examples. As described above, because a false SPS trigger that is misaligned with the subframe associated with the most recent C-RNTI grant may cause a transmission schedule to shift by one, two, or three subframes, the false SPS trigger may cause the UE to incorrectly discard subsequent (valid) C-RNTI grants that are multiples of four subframes after the most recent C-RNTI grant (prior to the SPS trigger). Accordingly, as described herein, the UE may use discarded C-RNTI grants as a metric to determine whether the SPS trigger was valid or invalid.

For example, as shown by reference number 650, the UE may receive one or more C-RNTI grants, subsequent to the detection of the SPS trigger that schedules the use of SPS resources in a subframe that is misaligned with TTI bundling resources (e.g., subframes associated with earlier C-RNTI grants). In general, as described above, the UE may discard a C-RNTI grant that is received subsequent to the detection of the SPS trigger if the C-RNTI grant indicates a grant time (e.g., a transmission subframe) that is not a multiple of four subframes from the subframe associated with the SPS trigger. Alternatively, the UE may perform bundled uplink transmissions based on the grant time indicated in the C-RNTI grant if the indicated grant time is a multiple of four subframes from the subframe associated with the SPS trigger. Accordingly, as shown by reference number 660, the UE may use discarded C-RNTI grants as a metric for validating the SPS trigger (e.g., because the UE discarding many C-RNTI grants from the base station is unexpected behavior).

For example, when the UE detects the SPS trigger after one or more C-RNTI grants that are associated with the TTI bundling configuration, the UE may initialize (e.g., set to zero) a first counter to track a total number of C-RNTI grants subsequent to the detection of the SPS trigger, and the UE may further initialize (e.g., set to zero) a second counter to track a number of the subsequent C-RNTI grants that are discarded. Accordingly, for each C-RNTI grant that is received subsequent to the detection of the SPS trigger, the UE may increment the first counter. Furthermore, if a grant time indicated in a subsequent C-RNTI grant is not a multiple of four subframes after the subframe associated with the SPS trigger, the UE may increment the second counter (e.g., because the UE would discard the C-RNTI grant due to the misalignment with the subframe associated with the SPS trigger). When the first counter satisfies (e.g., equals) a first threshold, meaning that the total number of C-RNTI grants subsequent to the detection of the SPS trigger satisfies the first threshold, the UE may determine a proportion of the C-RNTI grants that were discarded due to a misalignment with the subframe associated with the SPS trigger. For example, the UE may divide the second counter tracking the number of discarded C-RNTI grants by the first counter used to track the total number of C-RNTI grants to determine the proportion of discarded C-RNTI grants out of the threshold total number of C-RNTI bundling grants.

Accordingly, the UE may determine that the SPS trigger is invalid if the proportion of discarded C-RNTI grants satisfies (e.g., exceeds) a second threshold, or the UE may alternatively determine that the SPS trigger is valid if the proportion of discarded C-RNTI grants fails to satisfy (e.g., is less than or equal to) the second threshold. In some aspects, the second threshold may generally have a value between 0 and 1. In some aspects, the second threshold may have a value that is closer to 1 than to 0, which may indicate that the UE is unexpectedly discarding most of the C-RNTI grants provided by the base station. For example, the second threshold may have a value in a range from 0.6 to 0.8. However, it will be appreciated that other suitable values may be used (e.g., a lower value for the second threshold may be used to increase the probability of identifying an erroneously detected SPS trigger or an SPS trigger erroneously transmitted by the base station, although the lower value for the second threshold may also increase the probability of incorrectly invalidating the SPS trigger).

Furthermore, the value of the first threshold may be configurable to balance a tradeoff between an accurate validity assessment and preventing a communication session from terminating. For example, a larger value for the first threshold may result in the UE sampling more C-RNTI grants, which may result in a more accurate determination of the validity (or invalidity) of the SPS trigger, but a larger value for the first threshold may increase a probability that the communication session will be terminated. Accordingly, the first threshold may be set to a configurable value (e.g., ten) that allows the UE to accurately assess whether the SPS trigger is valid or invalid before the communication session terminates.

As further shown in FIG. 6, and by reference number 670, the UE may determine a transmission schedule for subsequent uplink transmissions based at least in part on the validity of the SPS trigger. For example, in some aspects, the UE may maintain a transmission schedule that is based at least in part on the subframe associated with the SPS trigger in cases where the SPS trigger is determined to be valid (e.g., the proportion of discarded C-RNTI grants fails to satisfy the second threshold, which indicates that the base station intended to activate the SPS resources in the misaligned subframe and shift the transmission schedule accordingly). In this case, the UE may expect subsequent C-RNTI grants to be associated with grant times that are multiples of four subframes after the subframe associated with the SPS trigger. Otherwise, the UE may revert to a previous transmission schedule (e.g., prior to the SPS trigger) in cases where the SPS trigger is determined to be invalid (e.g., the proportion of discarded C-RNTI grants satisfies the second threshold, which indicates that the base station erroneously transmitted the SPS trigger and/or that the UE detected the SPS trigger based on an erroneous PDCCH decoding result). In this case, the UE may expect subsequent C-RNTI grants to be associated with grant times that are multiples of four subframes after the most recent C-RNTI grant prior to the SPS trigger.

As indicated above, FIG. 6 is provided as an example. Other examples may differ from what is described with respect to FIG. 6.

Figure 7:
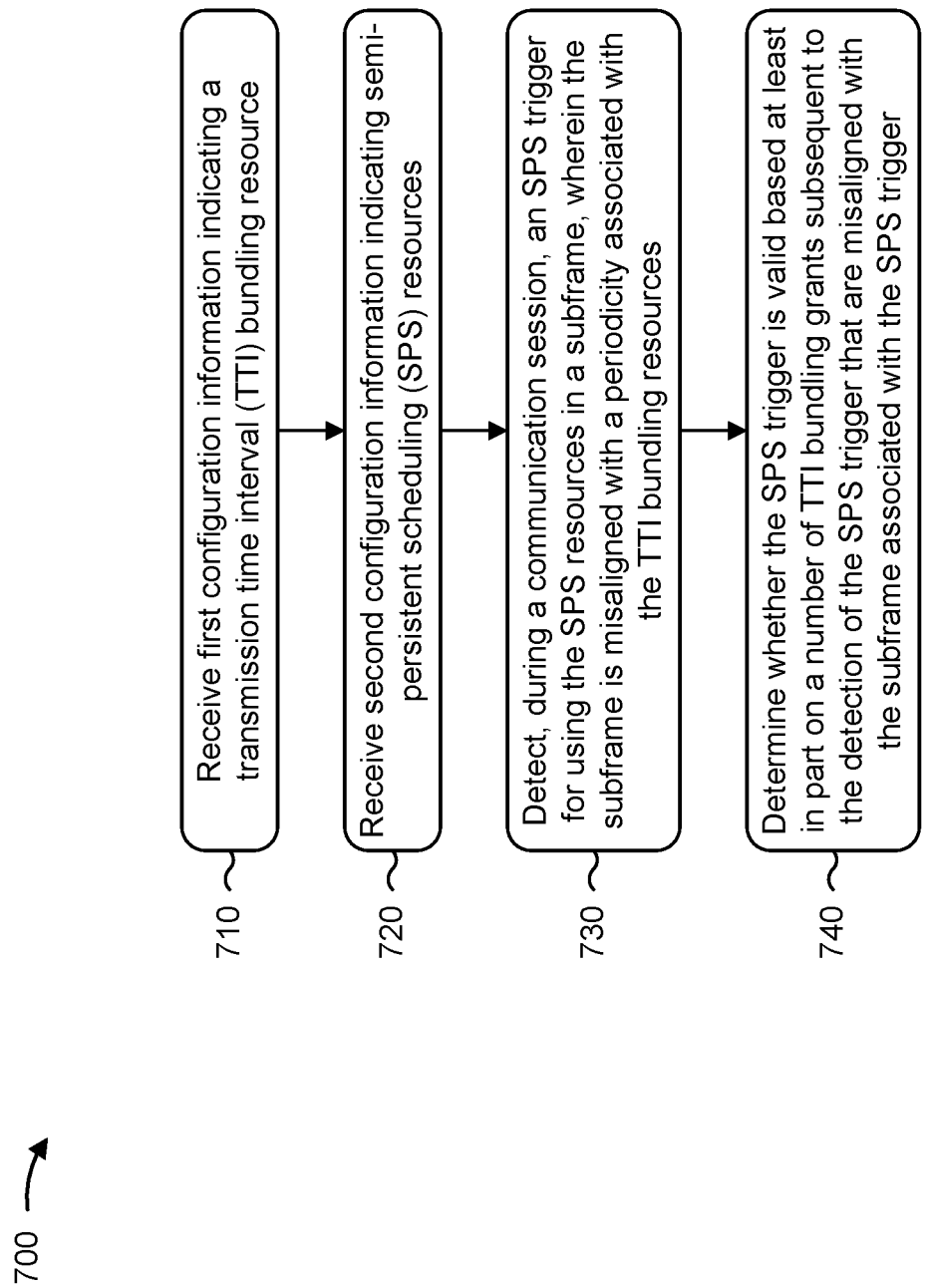
FIG. 7 is a diagram illustrating an example process associated with identifying a falsely triggered SPS grant in FDD traffic associated with TTI bundling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with identifying a falsely triggered SPS grant in FDD traffic associated with TTI bundling.

As shown in FIG. 7, in some aspects, process 700 may include receiving first configuration information indicating a TTI bundling resource (block 710). For example, the UE (e.g., using reception component 802, depicted in FIG. 8) may receive first configuration information indicating a TTI bundling resource, as described above.

As further shown in FIG. 7, in some aspects, process 700 may include receiving second configuration information indicating SPS resources (block 720). For example, the UE (e.g., using reception component 802, depicted in FIG. 8) may receive second configuration information indicating SPS resources, as described above.

As further shown in FIG. 7, in some aspects, process 700 may include detecting, during a communication session, an SPS trigger for using the SPS resources in a subframe, wherein the subframe is misaligned with a periodicity associated with the TTI bundling resource (block 730). For example, the UE (e.g., using SPS trigger detection component 808, depicted in FIG. 8) may detect, during a communication session, an SPS trigger for using the SPS resources in a subframe, wherein the subframe is misaligned with a periodicity associated with the TTI bundling resource, as described above.

As further shown in FIG. 7, in some aspects, process 700 may include determining whether the SPS trigger is valid based at least in part on a number of TTI bundling grants subsequent to the detection of the SPS trigger that are misaligned with the subframe associated with the SPS trigger (block 740). For example, the UE (e.g., using SPS trigger validation component 810, depicted in FIG. 8) may determine whether the SPS trigger is valid based at least in part on a number of TTI bundling grants subsequent to the detection of the SPS trigger that are misaligned with the subframe associated with the SPS trigger, as described above.

Process 700 may include additional aspects, such as any single aspect or any combination of aspects described below and/or in connection with one or more other processes described elsewhere herein.

In a first aspect, determining whether the SPS trigger is valid includes determining that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

In a second aspect, alone or in combination with the first aspect, process 700 includes reverting to a transmission schedule that is based at least in part on a grant time associated with a most recent TTI bundling grant prior to the SPS trigger based at least in part on the determination that the SPS trigger is invalid.

In a third aspect, alone or in combination with one or more of the first and second aspects, determining whether the SPS trigger is valid includes determining that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

In a fourth aspect, alone or in combination with one or more of the first through third aspects, process 700 includes maintaining a transmission schedule that is based at least in part on the subframe associated with the SPS trigger based at least in part on the determination that the SPS trigger is valid.

In a fifth aspect, alone or in combination with one or more of the first through fourth aspects, each of the TTI bundling grants is addressed to a C-RNTI assigned to the UE for TTI bundling.

In a sixth aspect, alone or in combination with one or more of the first through fifth aspects, the SPS trigger is detected based at least in part on an erroneous downlink control channel decoding result.

In a seventh aspect, alone or in combination with one or more of the first through sixth aspects, the SPS trigger is detected based at least in part on a downlink control channel message, received from a base station, erroneously triggering use of the SPS resources in the subframe that is misaligned with the periodicity associated with the TTI bundling resource.

In an eighth aspect, alone or in combination with one or more of the first through seventh aspects, the periodicity associated with the TTI bundling is based at least in part on a TTI bundle size.

In a ninth aspect, alone or in combination with one or more of the first through eighth aspects, the TTI bundle size is four.

In a tenth aspect, alone or in combination with one or more of the first through ninth aspects, the communication session includes traffic associated with a VoLTE call.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
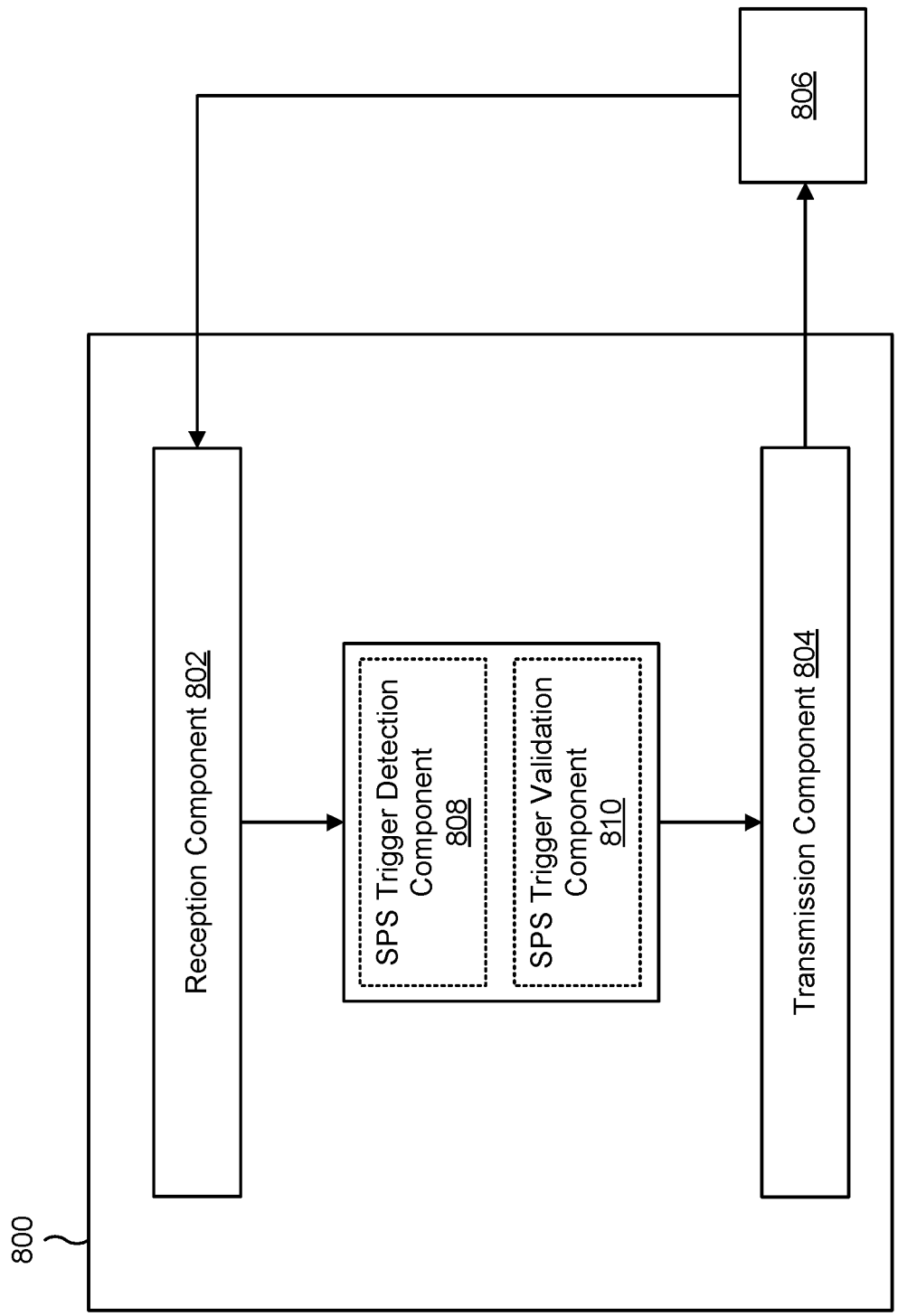
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of an SPS trigger detection component 808 or an SPS trigger validation component 810, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive first configuration information indicating a TTI bundling resource. The reception component 802 may receive second configuration information indicating SPS resources. The SPS trigger detection component 808 may detect, during a communication session, an SPS trigger for using the SPS resources in a subframe, wherein the subframe is misaligned with a periodicity associated with the TTI bundling resource. In some aspects, the SPS trigger detection component 808 may include one or more antennas, a demodulator, a MIMO detector, a receive processor, a controller/processor, a memory, or a combination thereof, of the UE described above in connection with FIG. 2. The SPS trigger validation component 810 may determine whether the SPS trigger is valid based at least in part on a number of TTI bundling grants subsequent to the detection of the SPS trigger that are misaligned with the subframe associated with the SPS trigger. In some aspects, the SPS trigger validation component 810 may include a controller/processor, a memory, or a combination thereof, of the UE described above in connection with FIG. 2.

The SPS trigger validation component 810 may determine that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

The transmission component 804 may revert to a transmission schedule that is based at least in part on a grant time associated with a most recent TTI bundling grant prior to the SPS trigger based at least in part on the determination that the SPS trigger is invalid.

The SPS trigger validation component 810 may determine that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

The transmission component 804 may maintain a transmission schedule that is based at least in part on the subframe associated with the SPS trigger based at least in part on the determination that the SPS trigger is valid.

The SPS trigger detection component 808 may detect the SPS trigger based at least in part on an erroneous downlink control channel decoding result.

The SPS trigger detection component 808 may detect the SPS trigger based at least in part on a downlink control channel message, received from a base station, erroneously triggering use of the SPS resources in the subframe that is misaligned with the periodicity associated with the TTI bundling resource.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving first configuration information indicating a TTI bundling resource; receiving second configuration information indicating SPS resources; detecting, during a communication session, an SPS trigger for using the SPS resources in a subframe, wherein the subframe is misaligned with a periodicity associated with the TTI bundling resource; and determining whether the SPS trigger is valid based at least in part on a number of TTI bundling grants subsequent to the detection of the SPS trigger that are misaligned with the subframe associated with the SPS trigger.

Aspect 2: The method of Aspect 1, wherein determining whether the SPS trigger is valid includes: determining that the SPS trigger is invalid based at least in part on a proportion of the number of TTI bundling grants that are misaligned with the subframe associated with the SPS trigger, out of a threshold number of TTI bundling grants subsequent to the detection of the SPS trigger, satisfying a threshold.

Aspect 3: The method of Aspect 2, further comprising: reverting to a transmission schedule that is based at least in part on a grant time associated with a most recent TTI bundling grant prior to the SPS trigger based at least in part on the determination that the SPS trigger is invalid.

Aspect 4: The method of Aspect 1, wherein determining whether the SPS trigger is valid includes: determining that the SPS trigger is valid based at least in part on a proportion of the number of TTI bundling grants that are misaligned with the subframe associated with the SPS trigger, out of a threshold number of TTI bundling grants subsequent to the detection of the SPS trigger, failing to satisfy a threshold.

Aspect 5: The method of Aspect 4, further comprising: maintaining a transmission schedule that is based at least in part on the subframe associated with the SPS trigger based at least in part on the determination that the SPS trigger is valid.

Aspect 6: The method of any of Aspects 1-5, wherein each of the TTI bundling grants is addressed to a C-RNTI assigned to the UE for TTI bundling.

Aspect 7: The method of any of Aspects 1-6, wherein the SPS trigger is detected based at least in part on an erroneous downlink control channel decoding result.

Aspect 8: The method of any of Aspects 1-7, wherein the SPS trigger is detected based at least in part on a downlink control channel message, received from a base station, erroneously triggering use of the SPS resources in the subframe that is misaligned with the periodicity associated with the TTI bundling resource.

Aspect 9: The method of any of Aspects 1-8, wherein the periodicity associated with the TTI bundling is based at least in part on a TTI bundle size.

Aspect 10: The method of Aspect 9, wherein the TTI bundle size is four.

Aspect 11: The method of any of Aspects 1-10, wherein the communication session includes traffic associated with a VoLTE call.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving first configuration information indicating a transmission time interval (TTI) bundling resource;
   receiving second configuration information indicating semi-persistent scheduling (SPS) resources;
   detecting, during a communication session, an SPS trigger for using the SPS resources in a subframe, wherein the subframe is misaligned with a periodicity associated with the TTI bundling resource; and
   determining whether the SPS trigger is valid based at least in part on a proportion of a number of TTI bundling grants subsequent to the detection of the SPS trigger that are misaligned with the subframe associated with the SPS trigger, out of a threshold number of TTI bundling grants subsequent to the detection of the SPS trigger, satisfying a threshold.

2. The method of claim 1, further comprising:
   reverting to a transmission schedule that is based at least in part on a grant time associated with a most recent TTI bundling grant prior to the SPS trigger based at least in part on the determination that the SPS trigger is invalid.

3. The method of claim 1, wherein determining whether the SPS trigger is valid includes:
   determining that the SPS trigger is valid based at least in part on the proportion of the number of TTI bundling grants that are misaligned with the subframe associated with the SPS trigger, out of the threshold number of TTI bundling grants subsequent to the detection of the SPS trigger, failing to satisfy the threshold.

4. The method of claim 3, further comprising:
   maintaining a transmission schedule that is based at least in part on the subframe associated with the SPS trigger based at least in part on the determination that the SPS trigger is valid.

5. The method of claim 1, wherein each of the TTI bundling grants is addressed to a cell radio network temporary identity assigned to the UE for TTI bundling.

6. The method of claim 1, wherein the SPS trigger is detected based at least in part on an erroneous downlink control channel decoding result.

7. The method of claim 1, wherein the SPS trigger is detected based at least in part on a downlink control channel message, received from a base station, erroneously triggering use of the SPS resources in the subframe that is misaligned with the periodicity associated with the TTI bundling resource.

8. The method of claim 1, wherein the periodicity associated with the TTI bundling is based at least in part on a TTI bundle size.

9. The method of claim 8, wherein the TTI bundle size is four.

10. The method of claim 1, wherein the communication session includes traffic associated with a Voice over Long Term Evolution (VOLTE) call.

11. A user equipment (UE) for wireless communication, comprising:
    one or more memories; and
    one or more processors, coupled to the one or more memories, configured to:
    receive first configuration information indicating a transmission time interval (TTI) bundling resource;
    receive second configuration information indicating semi-persistent scheduling (SPS) resources;
    detect, during a communication session, an SPS trigger for using the SPS resources in a subframe, wherein the subframe is misaligned with a periodicity associated with the TTI bundling resource; and determine whether the SPS trigger is valid based at least in part on a proportion of a number of TTI bundling grants subsequent to the detection of the SPS trigger that are misaligned with the subframe associated with the SPS trigger, out of a threshold number of TTI bundling grants subsequent to the detection of the SPS trigger, satisfying a threshold.

12. The UE of claim 11, wherein the one or more processors are further configured to:

revert to a transmission schedule that is based at least in part on a grant time associated with a most recent TTI bundling grant prior to the SPS trigger based at least in part on the determination that the SPS trigger is invalid.

13. The UE of claim 11, wherein the one or more processors, to determine whether the SPS trigger is valid, are configured to:

determine that the SPS trigger is valid based at least in part on the proportion of the number of TTI bundling grants that are misaligned with the subframe associated with the SPS trigger, out of the threshold number of TTI bundling grants subsequent to the detection of the SPS trigger, failing to satisfy the threshold.

14. The UE of claim 13, wherein the one or more processors are further configured to:

maintain a transmission schedule that is based at least in part on the subframe associated with the SPS trigger based at least in part on the determination that the SPS trigger is valid.

15. The UE of claim 11, wherein each of the TTI bundling grants is addressed to a cell radio network temporary identity assigned to the UE for TTI bundling.

16. The UE of claim 11, wherein the SPS trigger is detected based at least in part on an erroneous downlink control channel decoding result.

17. The UE of claim 11, wherein the SPS trigger is detected based at least in part on a downlink control channel message, received from a base station, erroneously triggering use of the SPS resources in the subframe that is misaligned with the periodicity associated with the TTI bundling resource.

18. The UE of claim 11, wherein the periodicity associated with the TTI bundling is based at least in part on a TTI bundle size.

19. The UE of claim 18, wherein the TTI bundle size is four.

20. The UE of claim 11, wherein the communication session includes traffic associated with a Voice over Long Term Evolution (VOLTE) call.

21. A non-transitory computer-readable medium storing a set of instructions for wireless communication, the set of instructions comprising:

one or more instructions that, when executed by one or more processors of a user equipment (UE), cause the UE to:

receive first configuration information indicating a transmission time interval (TTI) bundling resource;

receive second configuration information indicating semi-persistent scheduling (SPS) resources;

detect, during a communication session, an SPS trigger for using the SPS resources in a subframe, wherein the subframe is misaligned with a periodicity associated with the TTI bundling resource; and determine whether the SPS trigger is valid based at least in part on a proportion of a number of TTI bundling grants subsequent to the detection of the SPS trigger that are misaligned with the subframe associated with the SPS trigger, out of a threshold number of TTI bundling grants subsequent to the detection of the SPS trigger, satisfying a threshold.

22. The non-transitory computer-readable medium of claim 21, wherein the one or more instructions, that cause the UE to determine whether the SPS trigger is valid, cause the UE to:

determine that the SPS trigger is valid based at least in part on the proportion of the number of TTI bundling grants that are misaligned with the subframe associated with the SPS trigger, out of the threshold number of TTI bundling grants subsequent to the detection of the SPS trigger, failing to satisfy the threshold.

23. The non-transitory computer-readable medium of claim 21, wherein the SPS trigger is detected based at least in part on an erroneous downlink control channel decoding result or based at least in part on a downlink control channel message, received from a base station, erroneously triggering use of the SPS resources in the subframe that is misaligned with the periodicity associated with the TTI bundling resource.

24. An apparatus for wireless communication, comprising:

means for receiving first configuration information indicating a transmission time interval (TTI) bundling resource;

means for receiving second configuration information indicating semi-persistent scheduling (SPS) resources;

means for detecting, during a communication session, an SPS trigger for using the SPS resources in a subframe, wherein the subframe is misaligned with a periodicity associated with the TTI bundling resource; and means for determining whether the SPS trigger is valid based at least in part on a proportion of a number of TTI bundling grants subsequent to the detection of the SPS trigger that are misaligned with the subframe associated with the SPS trigger, out of a threshold number of TTI bundling grants subsequent to the detection of the SPS trigger, satisfying a threshold.

25. The apparatus of claim 24, wherein the means for determining whether the SPS trigger is valid includes:

means for determining that the SPS trigger is valid based at least in part on the proportion of the number of TTI bundling grants that are misaligned with the subframe associated with the SPS trigger, out of the threshold number of TTI bundling grants subsequent to the detection of the SPS trigger, failing to satisfy the threshold.

26. The apparatus of claim 24, wherein the SPS trigger is detected based at least in part on an erroneous downlink control channel decoding result or based at least in part on a downlink control channel message, received from a base station, erroneously triggering use of the SPS resources in the subframe that is misaligned with the periodicity associated with the TTI bundling resource.

* * * * *